United States Patent
Nagai et al.

(12)

(10) Patent No.: US 6,462,972 B2
(45) Date of Patent: Oct. 8, 2002

(54) POWER SOURCE APPARATUS FOR PROVIDING A POWER SOURCE IN A STANDBY MODE AND A PULSE GENERATING APPARATUS

(75) Inventors: Tamiji Nagai, Kanagawa; Tamon Ikeda, Tokyo; Kazuo Yamazaki, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/777,321

(22) Filed: Feb. 6, 2001

(65) Prior Publication Data

US 2001/0012210 A1 Aug. 9, 2001

(30) Foreign Application Priority Data

Feb. 8, 2000 (JP) ........................................ 2000-030628

(51) Int. Cl.[7] ............................................... H02M 3/24
(52) U.S. Cl. ....................................................... 363/95
(58) Field of Search ................................. 363/20, 21.01, 363/95, 97, 98, 131

(56) References Cited

U.S. PATENT DOCUMENTS 3,862,438 A * 1/1975 Sakakibara et al. ......... 307/238
4,614,999 A * 9/1986 Onodera et al. ............... 363/28
5,682,302 A * 10/1997 Wen ............................. 363/43
6,163,141 A * 12/2000 Yoshida et al. .............. 323/266

* cited by examiner

Primary Examiner—Adolf Deneke Berhane
(74) Attorney, Agent, or Firm—Frommer Lawrence & Haug LLP; William S. Frommer

(57) ABSTRACT

An intermittent pulse generator 1 is provided between terminals Ti1 and Ti2. In the intermittent pulse generator 1, pulses are generated from an AC power source which is supplied and the generated pulses are supplied to a controller 3. The controller 3 controls a switching circuit 2 in accordance with the pulses from the intermittent pulse generator 1 and a signal from a supplying mode detecting circuit 9. A rectifying circuit constructed by a diode bridge 5 and a capacitor 6 is provided for the secondary side of a transformer 4. An output of the rectifying circuit is supplied to an energy saving mode detecting circuit 7 and a supplying mode detecting circuit 9. The energy saving mode detecting circuit 7 is connected to an output terminal To through a switching circuit 8. When the energy saving mode is detected in the energy saving mode detecting circuit 7, a signal is supplied to the intermittent pulse generator 1.

12 Claims, 16 Drawing Sheets

POWER SOURCE APPARATUS FOR PROVIDING A POWER SOURCE IN A STANDBY MODE AND A PULSE GENERATING APPARATUS

BACKGROUND OF THE INVENTION

1. Field of the Invention

The invention relates to a power source apparatus and a pulse generating apparatus which can suppress a loss of electronic equipment in a standby mode.

2. Description of the Related Arts

Hitherto, a standby mode is provided for a TV apparatus and a VTR apparatus. The standby mode is a mode in which the operation of a main circuit of the apparatus is stopped. For example, the standby mode is a mode in which when some operation is instructed by a remote controller, such an instruction is received, thereby enabling the operation corresponding to the instruction to be immediately performed.

In the standby mode, a method whereby a power source to be supplied is stopped and only a receiving unit for receiving the instruction of some operation is made operative, thereby suppressing an electric power consumption is considered. At this time, for example, a capacitor is used for making only the receiving unit operative. A power source is supplied at a predetermined cycle in order to keep a voltage/current of the capacitor to a predetermined value or more. As mentioned above, a timer or an oscillator (OSC) is used for supplying the power source at a predetermined cycle.

However, since the timer or oscillator (OSC) is used, a large electric power consumption is expended, so that there is a problem such that the electric power consumption in the standby mode cannot be sufficiently suppressed.

OBJECTS AND SUMMARY OF THE INVENTION

It is, therefore, an object of the invention to provide a power source apparatus and a pulse generating apparatus which can sufficiently suppress an electronic power consumption in the standby mode.

According to the invention disclosed in claim 1, there is provided a power source apparatus having a standby mode, comprising pulse generating means to which an AC power source is supplied and which intermittently generates pulses by time constant means constructed by a resistor and a capacitor, wherein by turning on/off the power source by the pulses from the pulse generating means, the power source in the standby mode is formed.

According to the invention disclosed in claim 8, there is provided a pulse generating apparatus to which an AC power source is supplied, comprising: a time constant circuit constructed by a resistor and a capacitor; first voltage detecting means for detecting a voltage which is supplied; switching means; and second voltage detecting means for detecting a voltage which is outputted from the switching means, wherein when a voltage higher than a first reference voltage is detected by the first voltage detecting means after a time constant set by the time constant means, the switching means is turned on, and when a voltage lower than a second reference voltage is detected by the second voltage detecting means, the switching means is turned off, thereby intermittently generating pulses.

The above and other objects and features of the present invention will become apparent from the following detailed description and the appended claims with reference to the accompanying drawings.

DETAILED DESCRIPTION OF THE PREFERRED EMBODIMENTS

Figure 1:
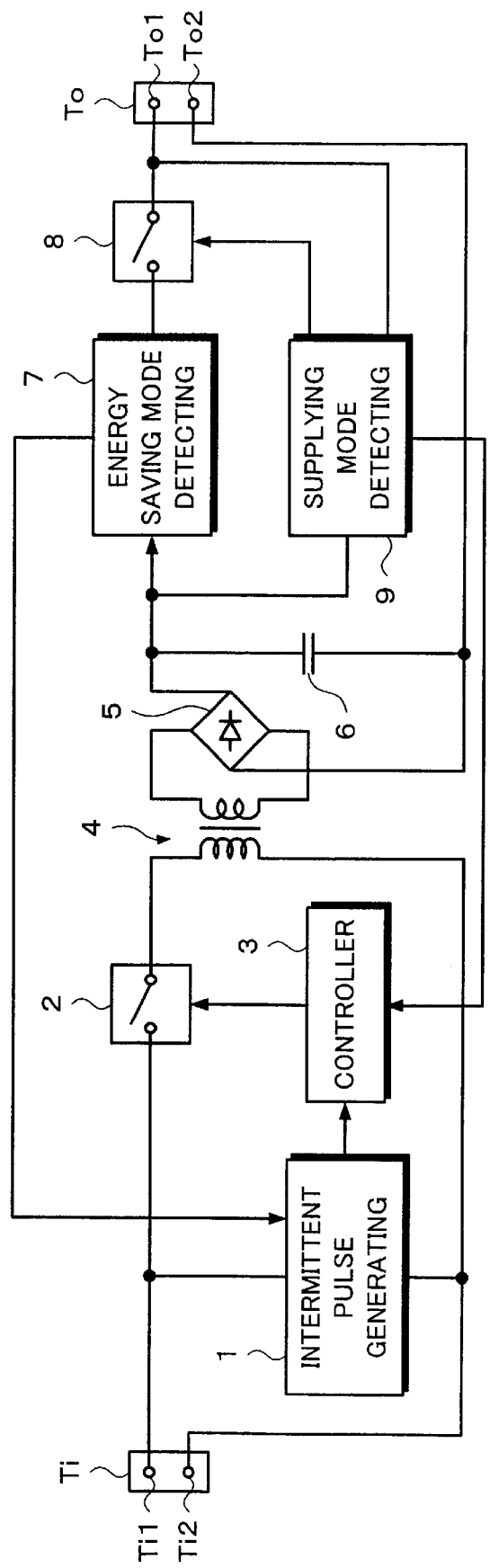
FIG. 1 is a block diagram of the first embodiment to which the invention is applied.

Embodiments of the invention will now be described hereinbelow with reference to the drawings. Component elements having the same functions in each diagram are designated by the same reference numerals, thereby avoiding their overlapped descriptions. FIG. 1 shows a whole construction of the first embodiment to which the invention is applied. An AC power source is supplied from an input terminal Ti constructed by terminals Ti1 and Ti2. An intermittent pulse generator 1 is provided between the terminals Ti1 and Ti2. One of two terminals of a switching circuit 2 is connected to the terminalTi1 and the other one is connected to one input terminal on the primary side of a transformer 4.

The other one on the primary side of the transformer 4 is connected to the terminal Ti2.

As will be explained hereinlater, the intermittent pulse generator 1 intermittently generates pulses from the supplied AC power source and supplies the generated pulses to a controller 3. The operation of the intermittent pulse generator 1 is performed in response to a signal from an energy saving mode detecting circuit 7. The controller 3 controls the on/off of the switching circuit 2 in response to the pulses from the intermittent pulse generator 1 and/or a signal from a supplying mode detecting circuit 9. When the switching circuit 2 is turned on, a power source is supplied to the primary side of the transformer 4.

A rectifying circuit comprising a diode bridge 5 and a capacitor 6 is provided on the secondary side of the transformer 4. One of output terminals of the diode bridge 5 is connected to the energy saving mode detecting circuit 7 and the other is connected to a terminal To2 of an output terminal To. The energy mode detecting circuit 7 is connected to a terminal To1 of the terminal To through a switching circuit 8. The supplying mode detecting circuit 9 is provided between one of the output terminals of the diode bridge 5 and the terminal To1.

In the energy saving mode detecting circuit 7, for example, a load current is detected and a current of ¹⁄₁₀₀ or less of an ordinary load current is detected. When it is determined that the operating mode is a standby mode, a signal is supplied to the intermittent pulse generator 1 so as to operate in an energy saving mode.

In the supplying mode detecting circuit 9, for example, the load current is detected and when it is detected that the load current is equal to or larger than a predetermined current value, a signal is supplied to the controller 3 so as to operate in a supplying mode. At this time, the controller 3 turns on the switching circuit 2. The supplying mode detecting circuit 9 can also detect a no-load. When no-load is detected, the switching circuit 8 is turned off.

Figure 2:
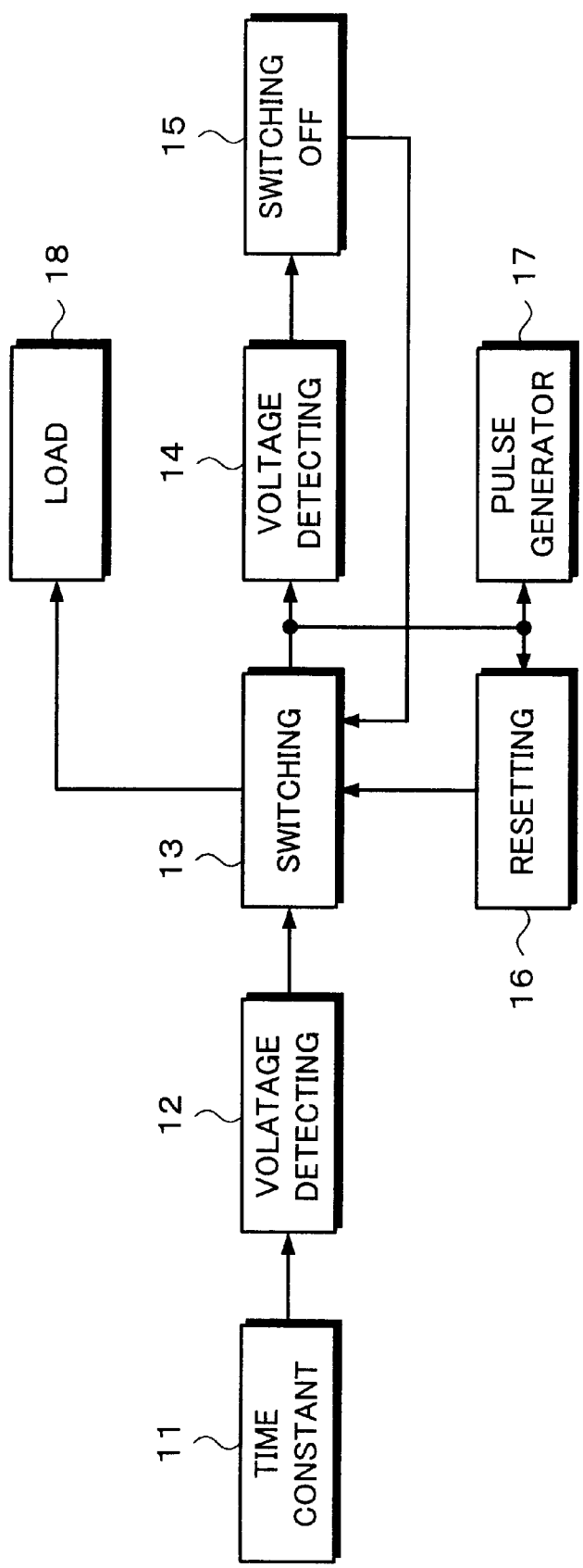
FIG. 2 is a block diagram showing an example of an intermittent pulse generator according to the invention.

FIG. 2 shows a block diagram of an example of the intermittent pulse generator 1 shown in the first embodiment. The intermittent pulse generator 1 shown in FIG. 2 intermittently generates pulses from the AC power source as mentioned above.

In a time constant circuit 11, for example, a predetermined time constant is set by a resistor and a capacitor. When a predetermined voltage is detected by a voltage detecting circuit 12 after the predetermined time constant, a switching circuit 13 is turned on. When the switching circuit 13 is turned on, a power source is supplied from the switching circuit 13 to a voltage detecting circuit 14, a resetting circuit 16, and a pulse generator 17. In the resetting circuit 16, the switching circuit 13 is turned off. In the pulse generator 17, pulses are generated.

If a voltage which is equal to or larger than a predetermined voltage is detected by the voltage detecting circuit 14 when the switching circuit 13 is ON, the switching circuit 13 is turned off through a switching OFF circuit 15. The pulses generated by turning on/off the switching circuit 13 as mentioned above are supplied to a load 18.

Figure 3:
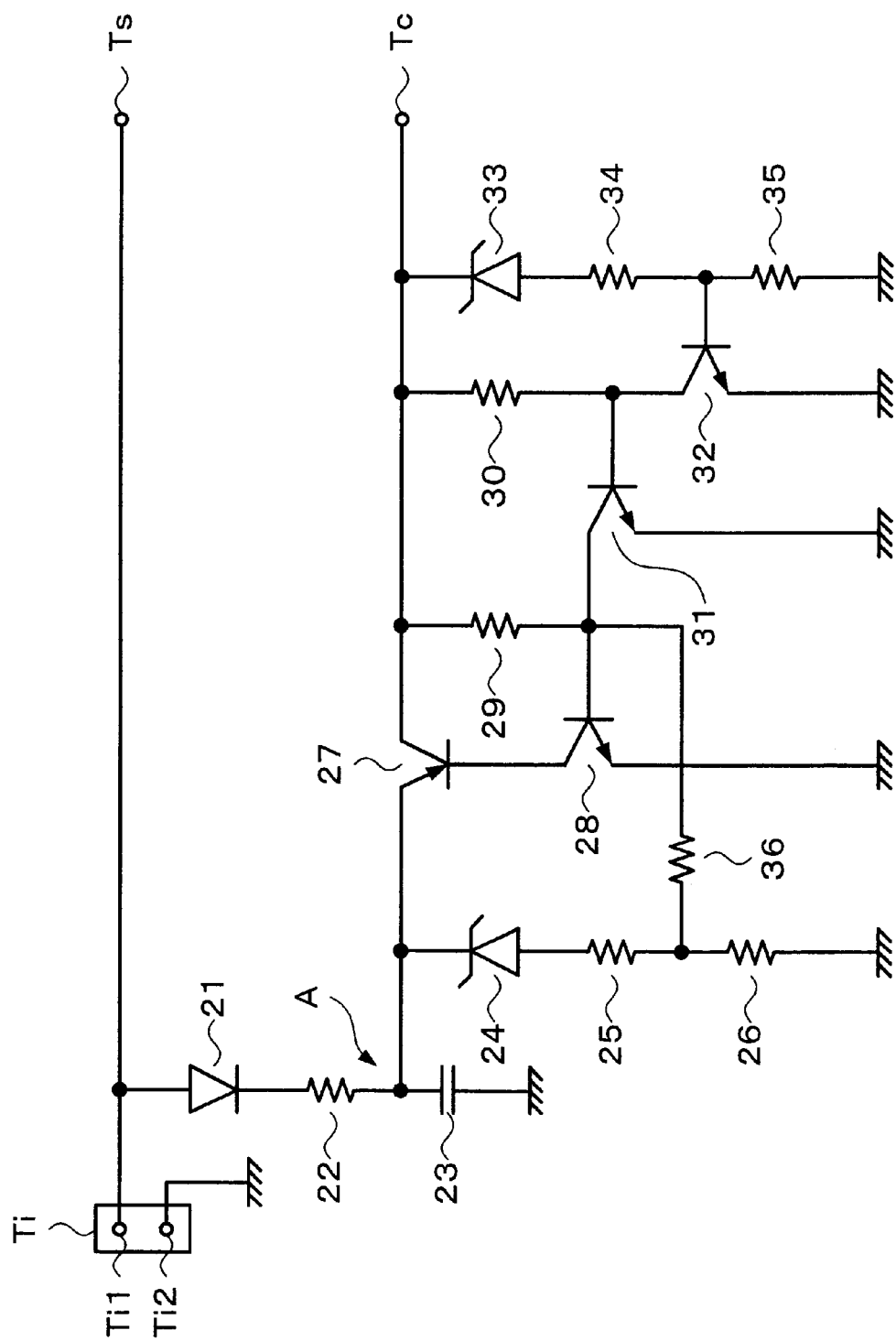
FIG. 3 is a circuit diagram showing an example of the intermittent pulse generator according to the invention.

FIG. 3 shows a circuit diagram of an example of the intermittent pulse generator 1 shown in the first embodiment. A diode 21 is a rectifying circuit. The time constant circuit 11 is constructed by a resistor 22 and a capacitor 23. The voltage detecting circuit 12 is constructed by a Zener diode 24 and resistors 25, 26, and 36. The switching circuit 13 is constructed by a pnp type transistor 27 and an npn type transistor 28. A resistor 29 corresponds to the resetting circuit 16. The switching OFF circuit 15 is constructed by a resistor 30 and npn type transistors 31 and 32. The voltage detecting circuit 14 is constructed by a Zener diode 33 and resistors 34 and 35. A collector of the transistor 27 is connected to a terminal Tc. The terminal Tc is connected to the controller 3. A terminal Ts is connected to one of the terminals on the primary side of the transformer 4 through the switching circuit 2.

Figure 4A:
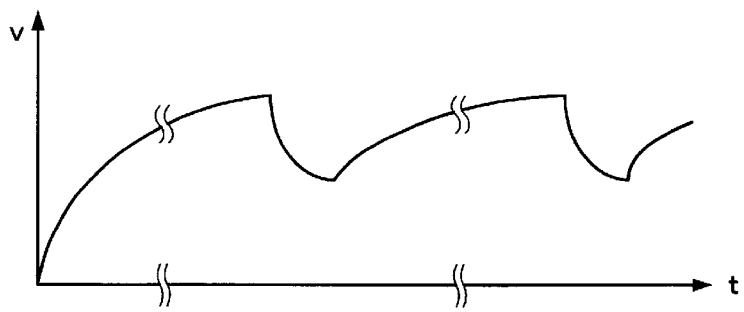
FIGS. 4A to 4C schematic diagrams for use in explanation of the invention.

An example of the operation of the intermittent pulse generator 1 shown in FIG. 3 will be explained. The inputted AC power source is rectified by the diode 21. A voltage is charged in the capacitor 23. At this time, a voltage at a node A of the resistor 22 and capacitor 23 is as shown in FIG. 4A. When the voltage at the node A is equal to a reference voltage of the Zener diode 24 or more, for example, 12V or more, the Zener diode 24 is turned on. The transistor 28 is turned on and the transistor 27 is turned on. The transistors 27 and 28 are reset by the resistor 29. The voltage is outputted through the terminal Tc until they are reset.

Figure 4B:
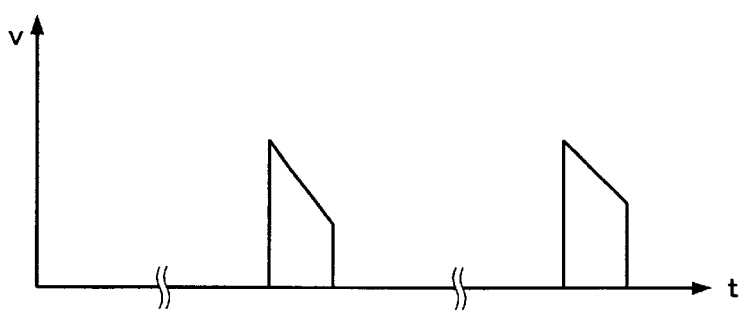

When the output voltage is equal to a reference voltage of the Zener diode 33 or less, for example, 6V or less, the Zener diode 33 is turned off. The transistor 32 is turned off, the transistor 31 is turned on, the transistor 28 is turned off, and the transistor 27 is turned off. At this time, a voltage shown in FIG. 4B is derived at a terminal Tc. The intermittent pulses are generated as mentioned above. In the embodiment, the power source circuit is intermittently made operative by using the intermittent pulses.

Figure 5:
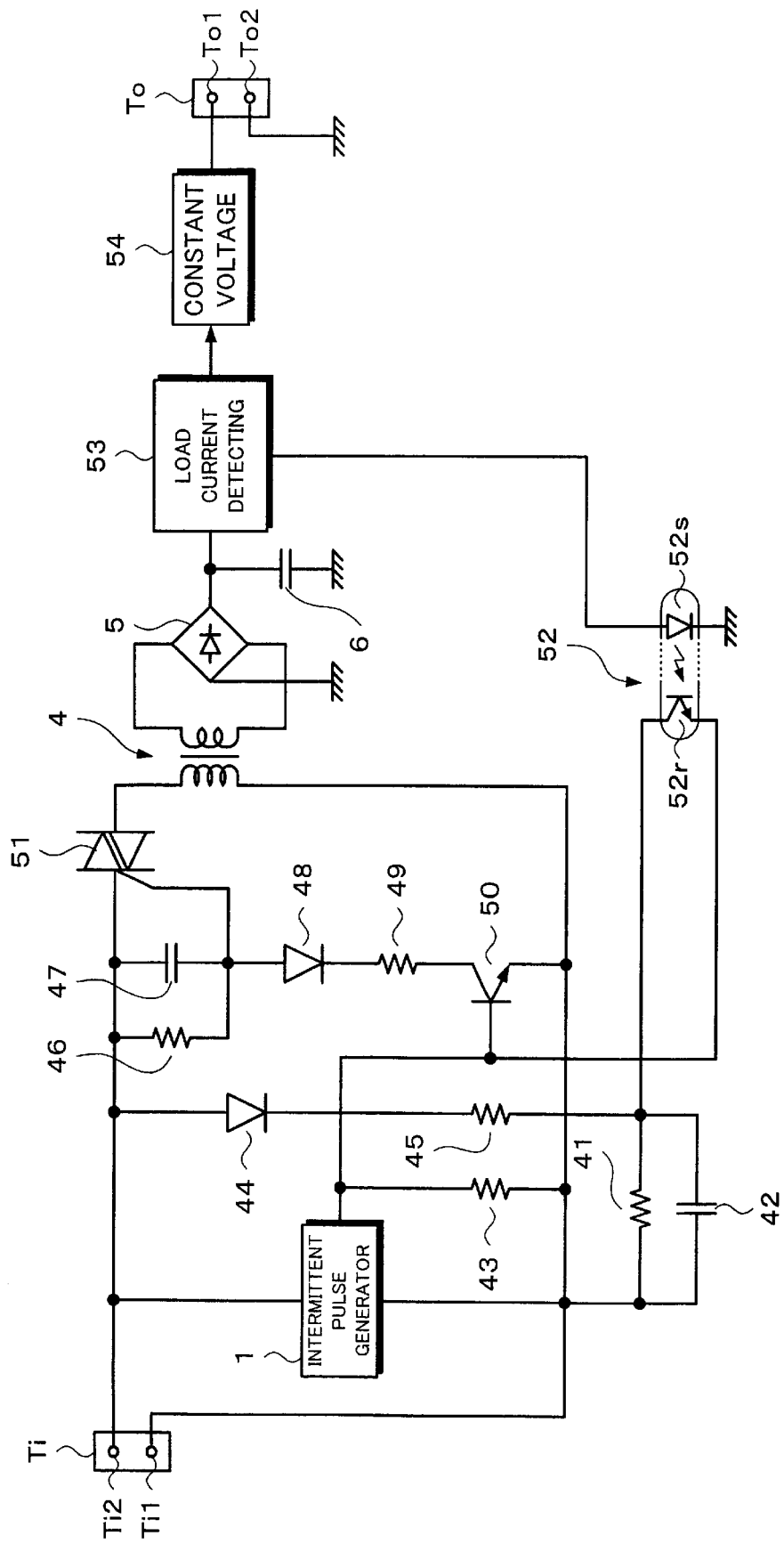
FIG. 5 is a diagram showing a specific construction of the first embodiment to which the invention is applied.

FIG. 5 shows a specific example of the switching circuit 2 and controller 3 in the first embodiment to which the invention is applied. In the second embodiment, a triac (triode AC switch) 51 is used as an example of the switching circuit 2. The on/off operations of the triac 51 are controlled through a photocoupler 52 from a load current detecting circuit 53 provided on the secondary side of the transformer 4.

A rectifying circuit constructed by the diode bridge 5 and capacitor 6 is connected to the load current detecting circuit 53. The load current detecting circuit 53 detects a load current. For example, when a current of a predetermined current value or more is detected, it is determined that the operating mode is the supplying mode. The triac 51 is turned on through the photocoupler 52 from the load current detecting circuit 53. A constant voltage circuit 54 generates a predetermined voltage for a load connected to the output terminal To.

Specifically speaking, when the load current is detected by the load current detecting circuit 53 and it is determined from the detected current that the operating mode is the supplying mode, a light emitting diode 52s of the photocoupler 52 emits light. When the light emitting diode 52s emits the light, a phototransistor 52r is turned on. When the phototransistor 52r is turned on, an npn type transistor 50 is turned on. When the transistor 50 is turned on, a bias voltage is applied to a gate of the triac 51, so that the triac 51 is turned on and the inputted AC power source is supplied to the transformer 4. The on/off operations of the transistor 50 are controlled also by the intermittent pulse generator 1. A time constant circuit is constructed by a resistor 41, a capacitor 42, a resistor 46, and a capacitor 47. A rectifying circuit is constructed by diodes 44 and 48.

Figure 4C:
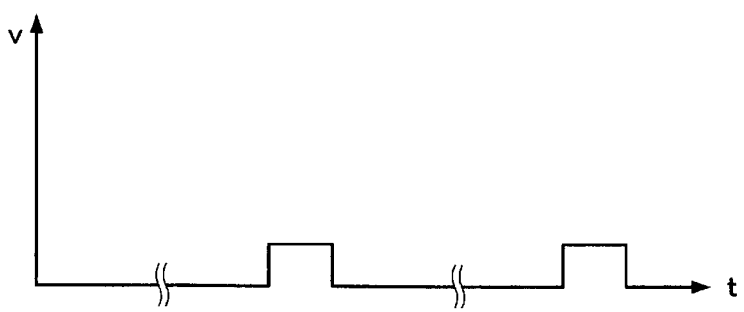

As mentioned above, in the construction of FIG. 5, while the voltage/current is supplied to the load, the triac 51 is turned on by the load current detecting circuit 53. While the supply of the voltage/current to the load is stopped because of the standby mode, the triac 51 is turned on at predetermined intervals by the intermittent pulse generator 1. A signal shown in FIG. 4C is an example of a signal at the time of on/off controlling the triac 51 by the intermittent pulse generator 1. This signal is generated at a base of the transistor 50 and the gate of the triac 51.

Figure 6:
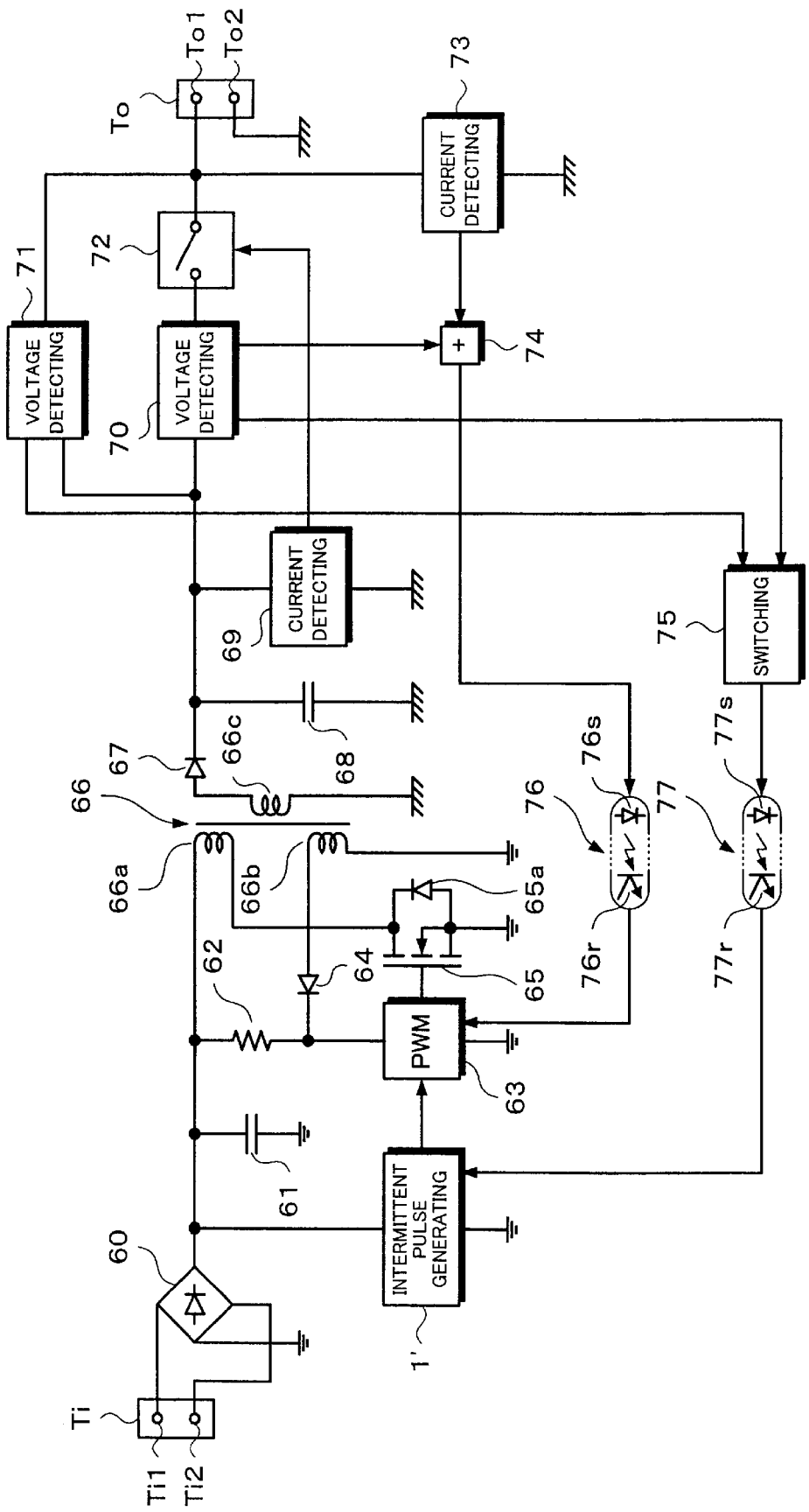
FIG. 6 is a block diagram of the second embodiment to which the invention is applied.
Figure 7A:
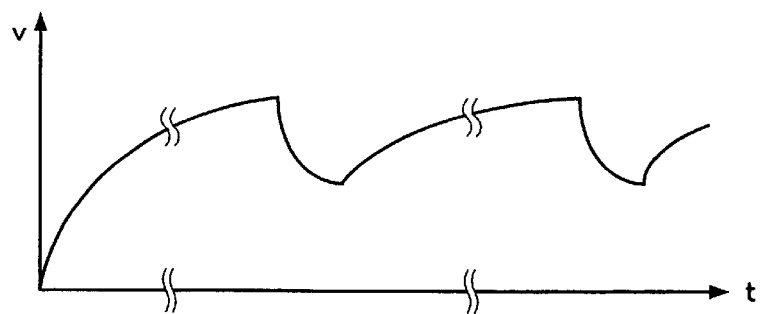
FIGS. 7A and 7B are schematic diagrams for use in explanation of the invention.
Figure 7B:
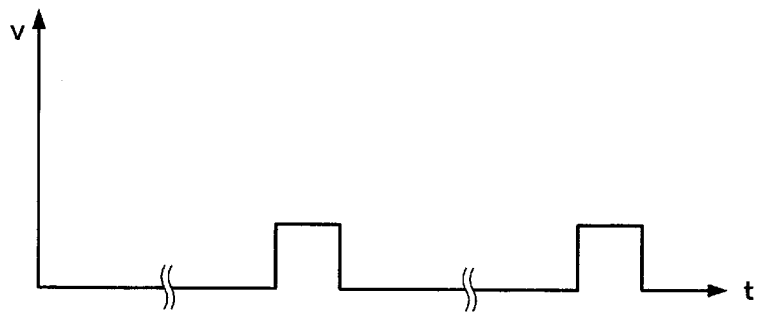

FIG. 6 shows the second embodiment of the invention. FIG. 6 shows the embodiment in case of applying the invention to the case of using a switching power source circuit. The power source inputted from the input terminal Ti is rectified by a diode bridge 60 and a capacitor 61. The rectified power source is supplied to the intermittent pulse generator 1. The intermittent pulse generator 1 supplies a signal to turn on/off an FET 65 to a PWM (pulse width modulating) circuit 63 as mentioned above. For example, a signal shown in FIG. 7B is supplied from the intermittent pulse generator 1 to the PWM circuit 63. The signal to turn on/off the FET 65 is supplied to the intermittent pulse generator 1 from the secondary side of a transformer 66 through a photocoupler 77.

The rectified power source is supplied to the PWM circuit 63 through a resistor 62. A signal is supplied from the secondary side of the transformer 66 through a photocoupler 76. The PWM circuit 63 supplies a signal to a gate of the FET 65 in response to the supplied signal. A drain of the FET 65 is connected to a winding 66a of the transformer 66 and a source is connected to the ground. A parasitic diode 65a is provided between the source and drain of the FET 65.

A cathode of a diode 64 is connected to the PWM circuit 63 and an anode is connected to one of terminals of a winding 66b of the transformer 66. The other of the winding 66b of the transformer 66 is connected to the ground.

One of terminals of a winding 66c serving as a secondary side of the transformer 66 is connected to a rectifying circuit constructed by a diode 67 and a capacitor 68. The other of the winding 66c is connected to the ground. A voltage which is outputted from the rectifying circuit is detected by a voltage detecting circuit 69. In the voltage detecting circuit 69, when a voltage of a predetermined voltage or more is detected, the switching circuit 72 is turned off.

In a current detecting circuit 70, if a load current of a predetermined current or less, for example, a current which is equal to or less than 1/100 of the ordinary current is detected, signals are supplied to an adder 74 and a switching circuit 75. The current detecting circuit 70 corresponds to the energy saving mode detecting circuit 7 in FIG. 1 mentioned above.

In a voltage detecting circuit 73, the voltage which is outputted from the output terminal To is detected. When the detected voltage is equal to or lower than a predetermined voltage, a signal is supplied from the voltage detecting circuit 73 to the adder 74. The adder 74 adds the signal from the current detecting circuit 70 and/or the signal from the voltage detecting circuit 73. The resultant addition signal is supplied to a light emitting diode 76s of the photocoupler 76 and supplied to the PWM circuit 63 through a phototransistor 76r of the photocoupler 76.

In a current detecting circuit 71, when a load current of a predetermined current or more is detected, a signal is supplied to the switching circuit 75. The current detecting circuit 71 corresponds to the supplying mode detecting circuit 9 in FIG. 1 mentioned above.

In the switching circuit 75, in response to the signal which is supplied from the current detecting circuit 70 and/or the signal which is supplied from the current detecting circuit 71, a signal is supplied to a light emitting diode 77s of the photocoupler 77 and supplied to the intermittent pulse generator 1 through a phototransistor 77r of a phototransistor 77r of a photocoupler 77.

Figure 8:
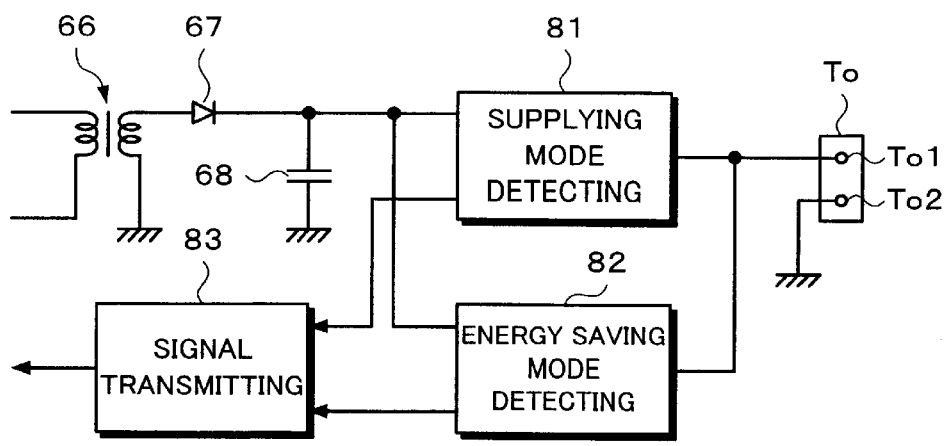
FIG. 8 is a schematic diagram for use in explanation of the invention.

FIG. 8 shows a block diagram on the secondary side of the transformer 66 in the second embodiment shown in FIG. 6. A power source which is outputted from a rectifying circuit is supplied to a supplying mode detecting circuit 81 and a power saving mode detecting circuit 82. In the supplying mode detecting circuit 81 and energy saving mode detecting circuit 82, the supplying mode and the energy saving mode are detected by the current which is detected as mentioned above. In a signal transmitting circuit 83, a signal is transmitted to the primary side of the transformer 66 in accordance with a signal from the supplying mode detecting circuit 81 and/or the energy saving mode detecting circuit 82.

Figure 9A:
FIGS. 9A to 9C are schematic diagrams for use in explanation of the invention.
Figure 9B:
Figure 9C:

In the intermittent pulse generator 1 of the invention according to the first and second embodiments, when the input power source is stable at a desired voltage, a frequency of the intermittent pulses is also stable. However, if the input power source fluctuates, the frequency of the intermittent pulses also fluctuates. For example, a pulse signal shown in FIG. 9A is outputted from the intermittent pulse generator 1 when the input power source is stable at a desired voltage. On the other hand, a pulse signal shown in FIG. 9B is outputted from the intermittent pulse generator 1 when the input power source is lower than the desired voltage and a duration of a pause period of the intermitting operation becomes longer than that in FIG. 9A. Further, a pulse signal shown in FIG. 9C is outputted from the intermittent pulse generator 1 when the input power source is higher than the desired voltage and a duration of a pause period of the intermitting operation is shorter than that in FIG. 9A.

It is, therefore, preferable to suppress the fluctuation of the input power source and prevent the fluctuation of the frequency of the intermittent pulses. Several examples for such a purpose will now be described. Circuit diagrams or block diagrams which will be shown below, the diode 21, resistor 22, and capacitor 23 are removed from the intermittent pulse generator 1 shown in FIG. 3 mentioned above and those diagrams are provided at the front stage of the input of an intermittent pulse generator 1' from which they were removed.

Figure 10:
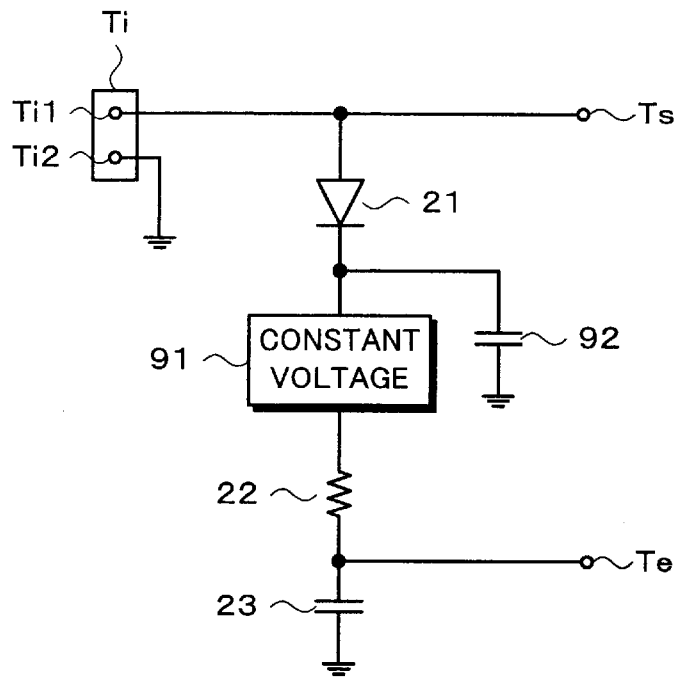
FIG. 10 is a block diagram showing a first example which is applied to the invention.

First, FIG. 10 shows the first example in which a constant voltage circuit is provided for an input section of the intermittent pulse generator 1 to thereby stabilize the input power source. A constant voltage circuit 91 is provided between a cathode of the diode 21 and the resistor 22. A capacitor 92 is inserted between the cathode of the diode 21 and the ground. The terminal Ts is connected to the switching circuit 2. A terminal Te is connected to an emitter of the transistor 27.

Figure 11:
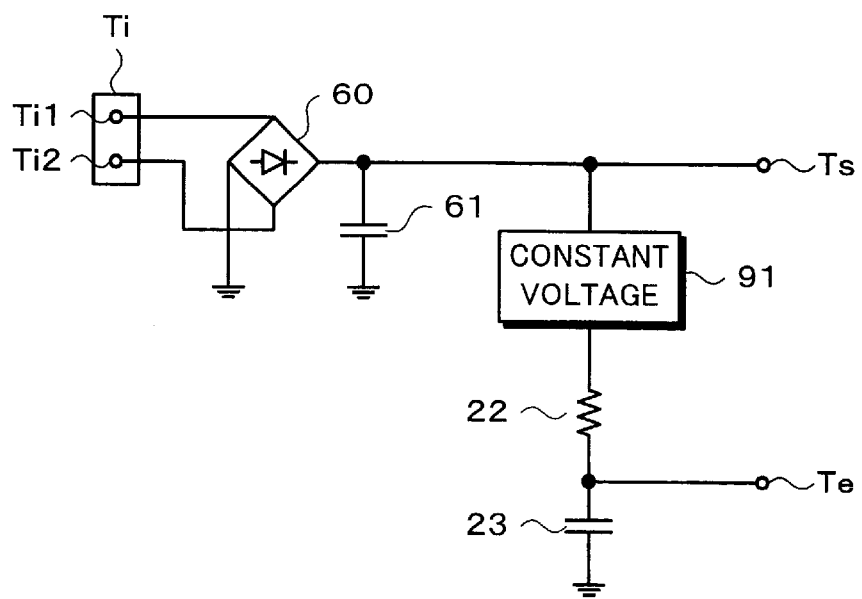
FIG. 11 is a block diagram showing the second example which is applied to the invention.

FIG. 11 shows a circuit diagram of the second example in which a constant voltage circuit is provided for the input section of the intermittent pulse generator 1' shown in FIG. 6 to thereby stabilize the input power source. The constant voltage circuit 91 is provided between one of output terminals of the diode bridge 60 and one of terminals of the resistor 22.

Figure 12:
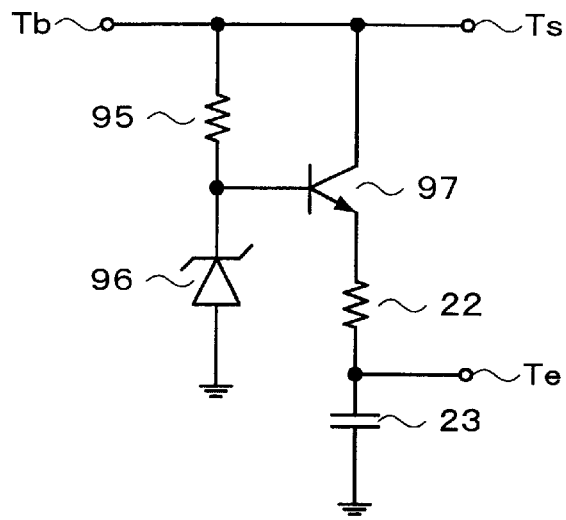
FIG. 12 is a circuit diagram showing an example of a constant voltage circuit which is applied to the invention.

FIG. 12 shows a circuit diagram of an example of the constant voltage circuit 91. In this example, the constant voltage circuit 91 is constructed by a resistor 95, a Zener diode 96, and an npn type transistor 97. The rectified power source is supplied to the constant voltage circuit 91 through a terminal Tb. When the input power source is higher than a reference voltage of the Zener diode 96, the Zener diode 96 is turned on and the transistor 97 is turned off. When the input power source is lower than the reference voltage of the Zener diode 96, the Zener diode 96 is turned off, so that the transistor 97 is turned on.

As mentioned above, by providing the constant voltage circuit 91 for the input section of the intermittent pulse generator 1', the input power source which is supplied to the intermittent pulse generator 1' can be stabilized to a desired voltage. Although FIGS. 10 and 11 show the examples in which the constant voltage circuit 91 is provided at the front stage of the input of the intermittent pulse generator 1', it can be also provided in the intermittent pulse generator 1.

Figure 13:
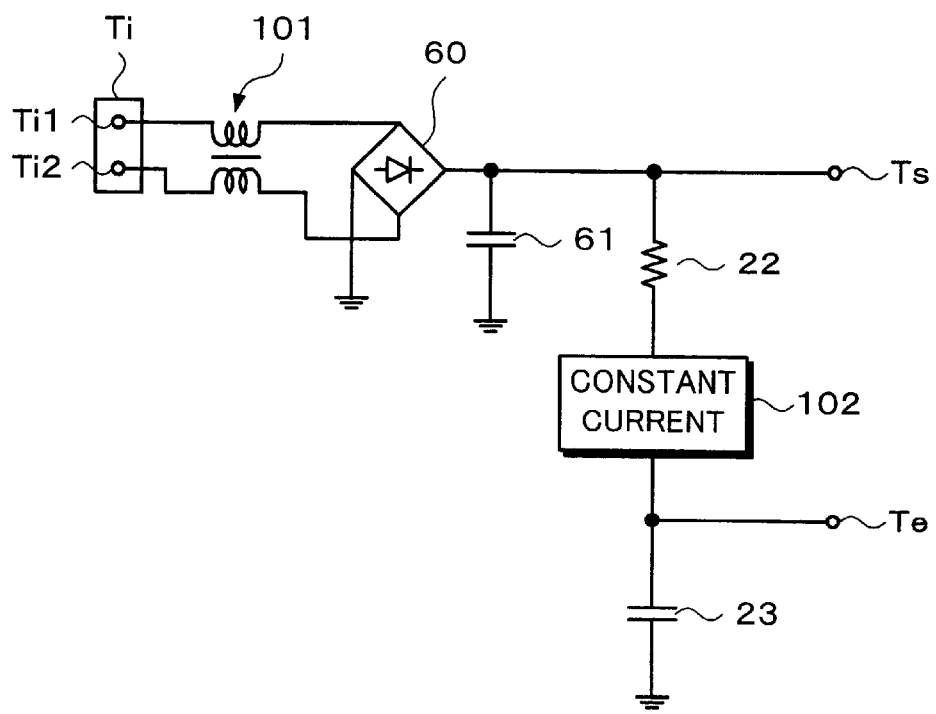
FIG. 13 is a block diagram showing an example which is applied to the invention.

FIG. 13 shows an example in which a constant current circuit is used for stabilizing the input power source. In FIG. 13, the constant current circuit is provided for the input section of the intermittent pulse generator 1 shown in FIG. 6, thereby stabilizing the input power source. A constant current circuit 102 is provided between the resistor 22 and capacitor 23. A filter 101 for removing noises is provided between the input terminal Ti and the diode bridge 60.

Figure 14:
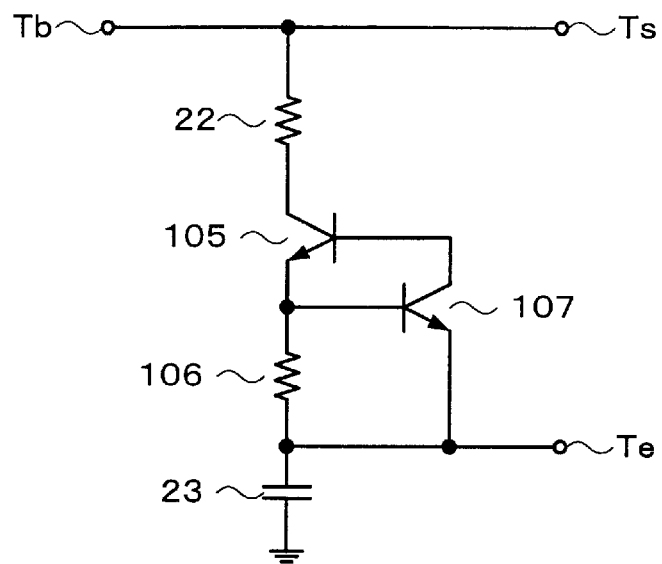
FIG. 14 is a circuit diagram showing an example of a constant current circuit which is applied to the invention.

FIG. 14 shows a circuit diagram of an example of the constant current circuit 102. The constant current circuit 102 is constructed by npn type transistors 105 and 107 and a resistor 106.

Figure 15:
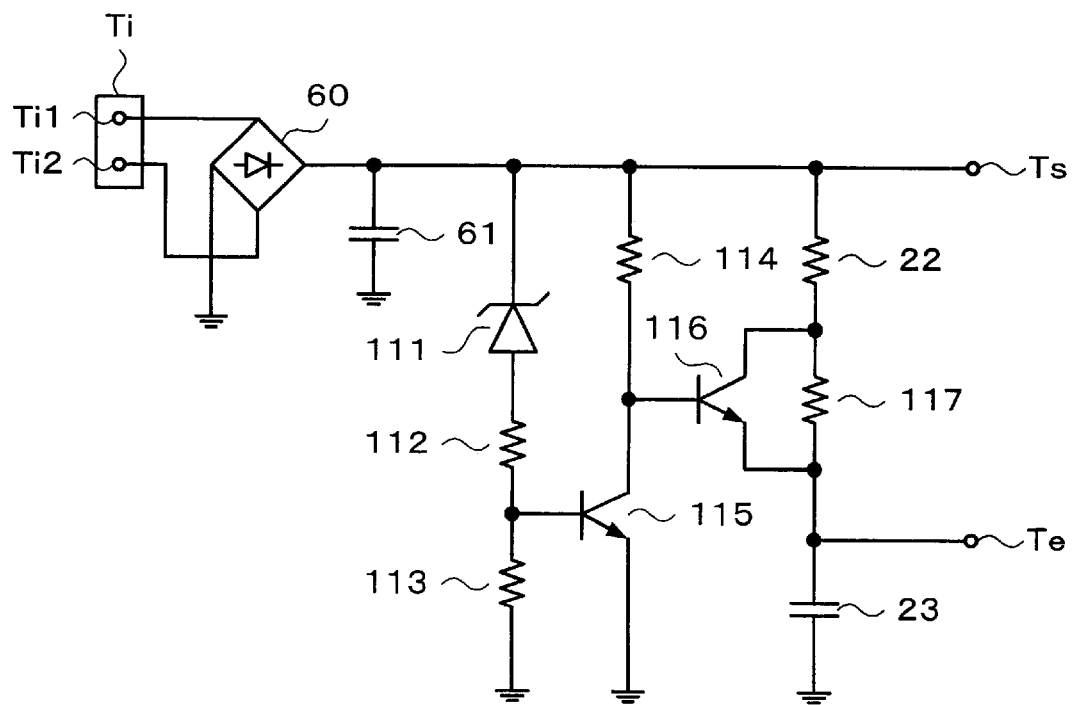
FIG. 15 is a circuit diagram showing an example to which the invention can be applied.
Figure 16:
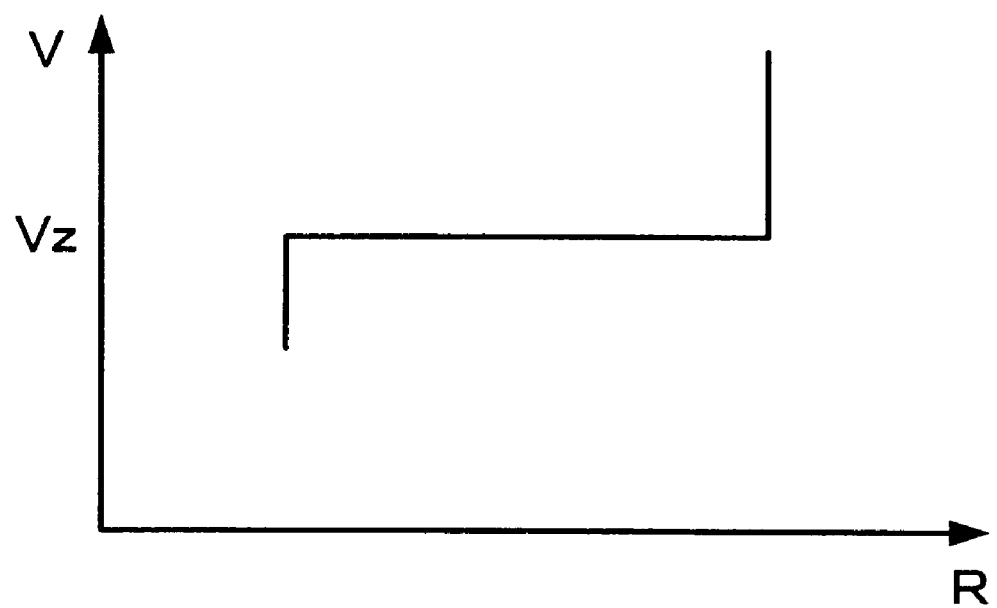
FIG. 16 is a schematic diagram for explaining the invention.

FIG. 15 shows an example in which an input voltage is detected and an input impedance of the intermittent pulse generator 1' is switched. When the input voltage exceeds a reference voltage of a Zener diode 111, the Zener diode 111 is turned on, a transistor 115 is turned on, and a transistor 116 is turned off. When the input voltage is equal to or lower than the reference voltage of the Zener diode 111, the Zener diode 111 is turned off, the npn type transistor 115 is turned off, and the npn type transistor 116 is turned on. Therefore, as shown in FIG. 16, when the input voltage exceeds a predetermined voltage Vz, the transistor 116 is turned off and an input impedance R rises. At this time, as shown in FIG. 9C mentioned above, a pause period of the intermitting operation is shortened. If the input voltage is equal to or lower than the predetermined voltage Vz, the transistor 116 is turned on and the input impedance R decreases. At this time, as shown in FIG. 9B, a duration of the pause period of the intermitting operation becomes long.

That is, when the input power source exceeds the reference voltage Vz of the Zener diode 111, a time constant can be increased by increasing the input impedance R. When the input power source is equal to or lower than the reference voltage Vz of the Zener diode 111, the time constant can be reduced by decreasing the input impedance R. Therefore, a stable power source can be extracted from the terminal Te.

Figure 17:
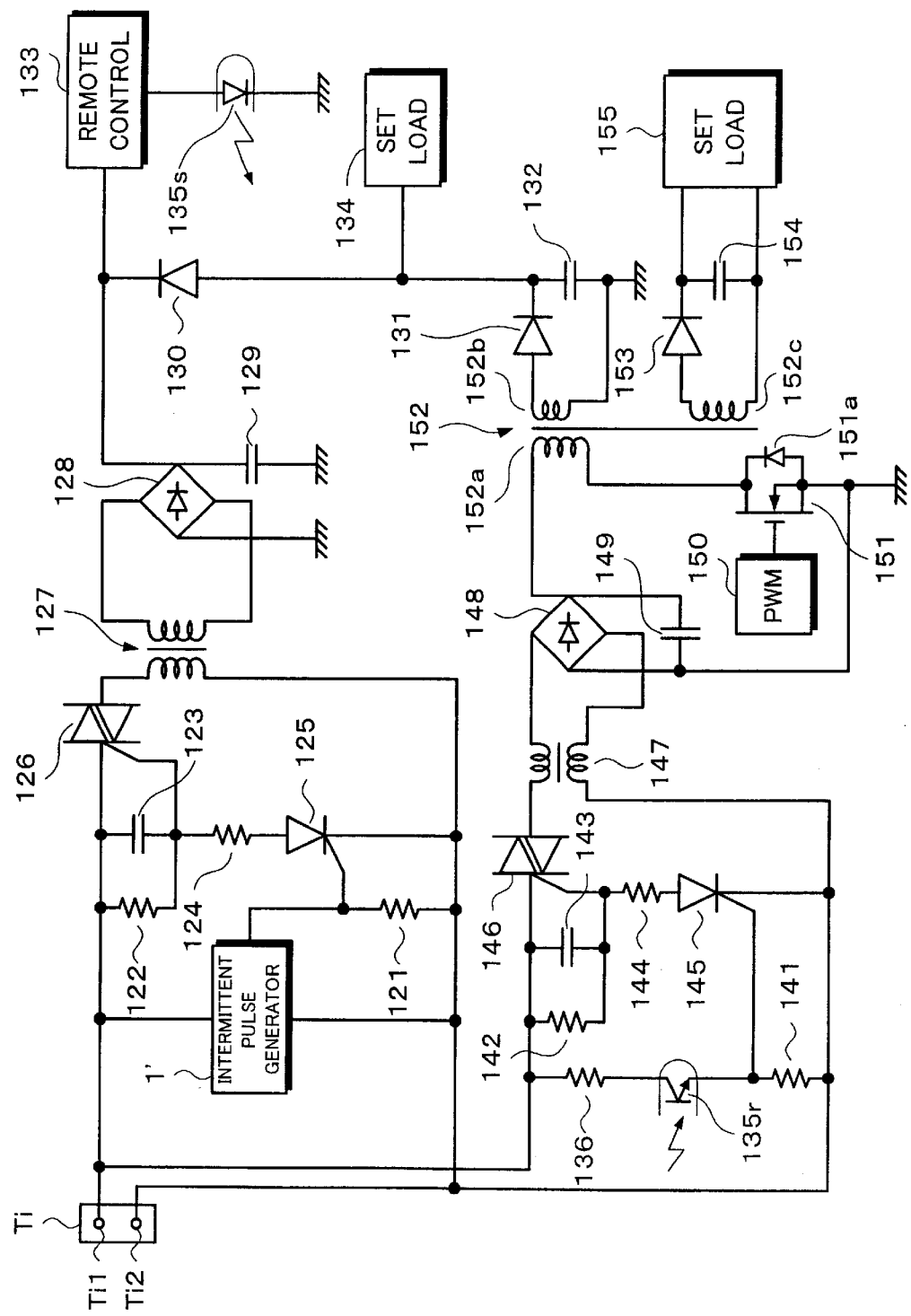
FIG. 17 is a block diagram of the third embodiment to which the invention is applied.

FIG. 17 shows the third embodiment of the invention. FIG. 17 is an example in which a power source is used in a receiving section of the remote controller in the standby mode. FIG. 17 shows an example in which a power source section for the standby mode for supplying a power source to a photosensing section of the remote controller is provided separately from a main power source section.

First, the power source section for the standby mode will be described. A thyristor 125 is provided for a control section connected to a gate of a triac 126. The control section is constructed by resistors 121, 123, and 124, a capacitor 122, and the thyristor 125. A control signal is supplied to a gate of the thyristor 125 from the intermittent pulse generator 1'. In response to the control signal, the thyristor 125 is turned on/off. When the thyristor 125 is turned on, the triac 126 is turned on. When the triac 126 is turned on, a rectified power source is outputted through a transformer 127 from a diode bridge 128 and a capacitor 129 constructing a rectifying circuit.

The power source rectified by the diode bridge 128 and capacitor 129 is supplied to a remote control receiving circuit 133. When a signal from the remote controller is received, the remote control receiving circuit 133 supplies the signal to a light emitting diode 135s of a photocoupler. The light emitting diode 135s to which the signal was supplied emits light. The emitted light is received by a photodiode 135r of the photocoupler, so that the photodiode 135r is turned on.

The main power source section will now be described. When the photodiode 135r is turned on, a thyristor 145 is turned on and a triac 146 is turned on. A control section is connected to a gate of the triac 146 in a manner similar to the foregoing triac 126. The control section is constructed by resistors 141, 142, and 144, a capacitor 143, and the thyristor 145. When the triac 146 is turned on, the power source is supplied to a rectifying circuit constructed by a diode bridge 148 and a capacitor 149 through a filter 147 for removing noises. The power source rectified by the rectifying circuit is supplied to one of terminals of a winding 152a of a transformer 152. A drain of an FET 151 is connected to the other of the winding 152a of the transformer 152 and a source is connected to the ground. A PWM circuit 150 is connected to a gate of the FET 151. A parasitic diode 151a is provided for the FET 151.

A rectifying circuit constructed by a diode 131 and a capacitor 132 is provided for a winding 152b of the transformer 152. A power source rectified by the rectifying circuit is supplied to the remote control receiving circuit 133 through a set load 134 and a diode 130.

A rectifying circuit constructed by a diode 153 and a capacitor 154 is provided for a winding 152c of the transformer 152. A power source rectified by the rectifying circuit is supplied to a set load 155.

As mentioned above, when an instruction to start the operation from the remote controller is received by the remote control receiving circuit 133, a power source is outputted from a main power source section comprising a switching power source. When the main power source section is turned on, the power source is supplied to the remote control receiving circuit 133 through the winding 152b of the transformer 152. When an instruction to stop the operation from the remote controller is received by the remote control receiving circuit 133, the photocoupler is turned off, so that the triac 146 is turned off.

Figure 18:
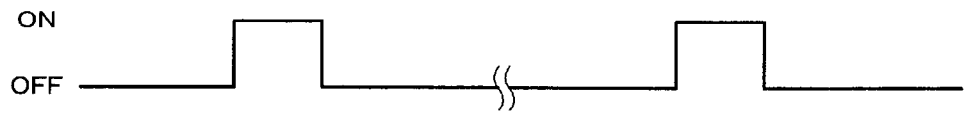
FIG. 18 is a schematic diagram for explaining the invention.

When the main power source section is OFF, a timing at which the power source is outputted from the power source section for the standby mode is determined by a capacitance of the capacitor 129. For example, as shown in FIG. 18, an interval at which the triac 126 is turned on can be selected from a range of tens of seconds to a few minutes. That is, the capacitance of the capacitor 129 is selected so as to minimize an electric power consumption in the standby mode.

Figure 19:
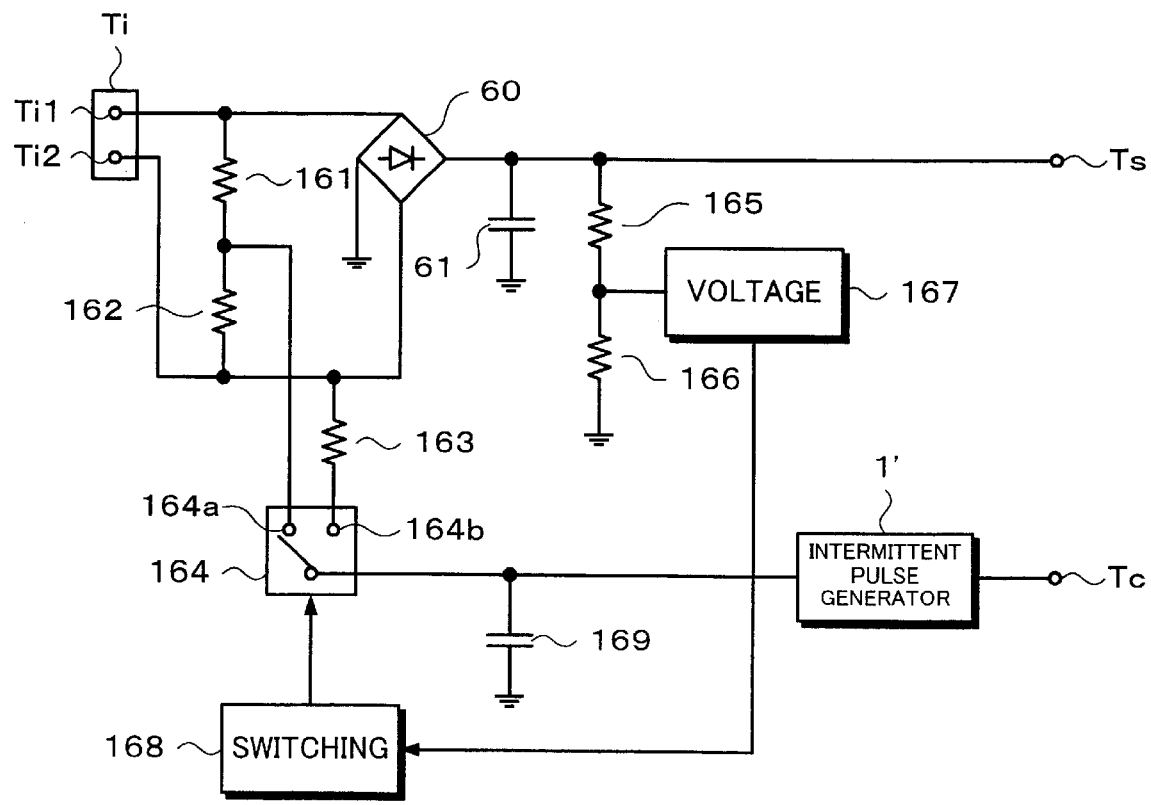
FIG. 19 is a block diagram showing the first example to which the invention can be applied.

Several examples in which the fluctuation of the frequency of the intermittent pulses can be prevented even if any AC power source which is different in dependence on the district is supplied to the intermittent pulse generator 1' of the invention will now be described. FIG. 19 shows the first example. Resistors 161 and 162 are serially provided between the terminals Ti1 and Ti2. A full-wave rectified current is extracted from a node of the resistors 161 and 162. The extracted full-wave rectified current is supplied to a terminal 164a of a switching circuit 164. A half-wave rectified current is extracted from the terminal Ti2 through a resistor 163. The extracted half-wave rectified current is supplied to a terminal 164b of the switching circuit 164.

The voltage of the power source which is outputted from the diode bridge 60 is detected by a voltage detecting circuit 167 provided at a node of resistors 165 and 166. The voltage detecting circuit 167 supplies a signal to a switching circuit 168 in accordance with the detected voltage. The switching circuit 168 switches the switching circuit 164 in response to the supplied signal. For example, when a voltage of 100V is detected, the terminal 164a is selected in the switching circuit 164. When a voltage of 200V is detected by the voltage detecting circuit 167, the terminal 164b is selected in the switching circuit 164. In the switching circuit 164, the selected full-wave rectified current or the half-wave rectified current is supplied to the intermittent pulse generator 1'.

Figure 20:
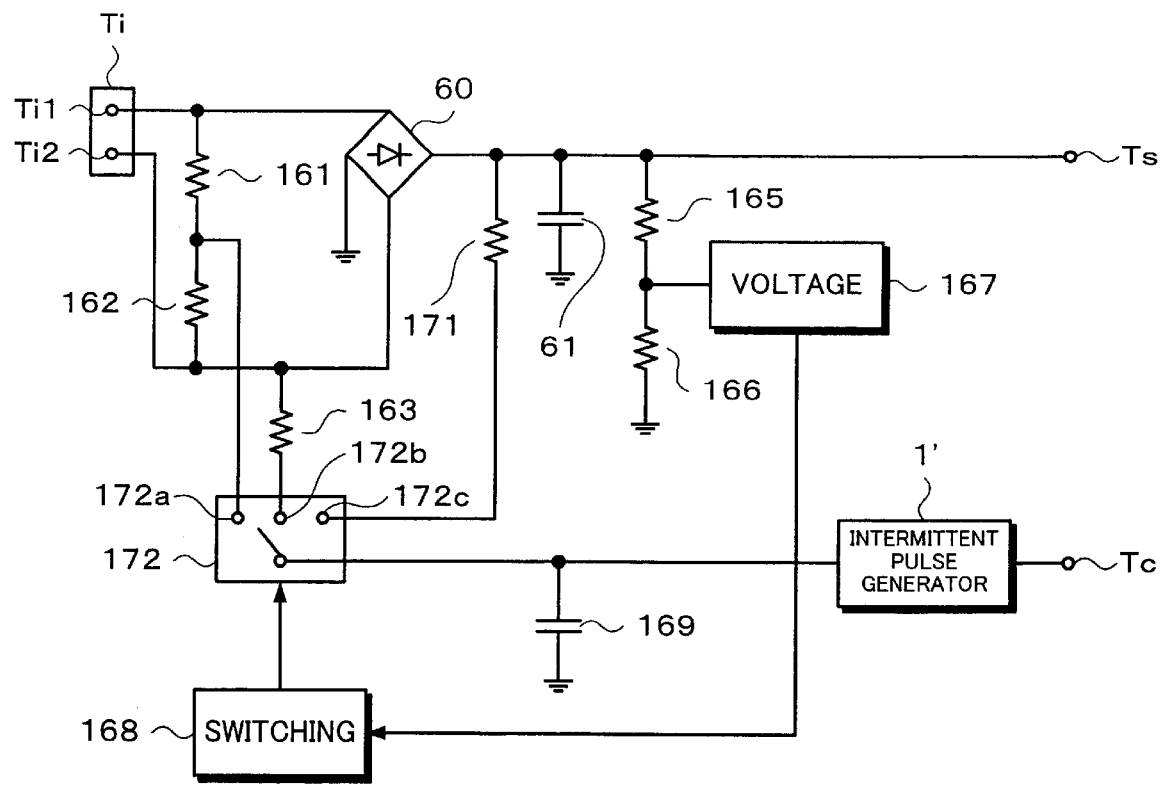
FIG. 20 is a block diagram showing the second example to which the invention can be applied.

FIG. 20 shows the second example. The full-wave rectified current is supplied to a terminal 172a of a switching circuit 172. The half-wave rectified current is supplied to a terminal 172b of the switching circuit 172. The full-wave rectified current which is outputted from the diode bridge 60 is supplied to a terminal 172c of the switching circuit 172 through a resistor 171. For example, when a voltage of 180V is detected by the voltage detecting circuit 167, the terminal 172a is selected in the switching circuit 172. When a voltage of 240V is detected, a terminal 172b is selected in the switching circuit 172. When a voltage of 100V is detected, the terminal 172c is selected in the switching circuit 172.

As mentioned above, since the optimum power source can be inputted to the intermittent pulse generator 1' in accordance with the AC power source which is inputted, the fluctuation of the intermittent pulses can be prevented. Therefore, even in the district of a different AC power source, the power source can be similarly used.

Figure 21:
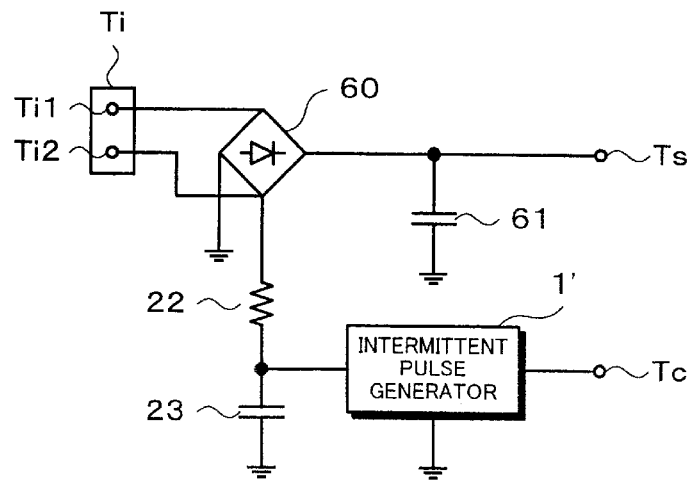
FIG. 21 is a block diagram showing an example for explaining the invention.

FIG. 21 shows an example in the case where the half-wave rectified current is selected. In the example, the half-wave rectified current is supplied to the intermittent pulse generator 1' through the time constant circuit comprising the resistor 22 and capacitor 23.

Figure 22:
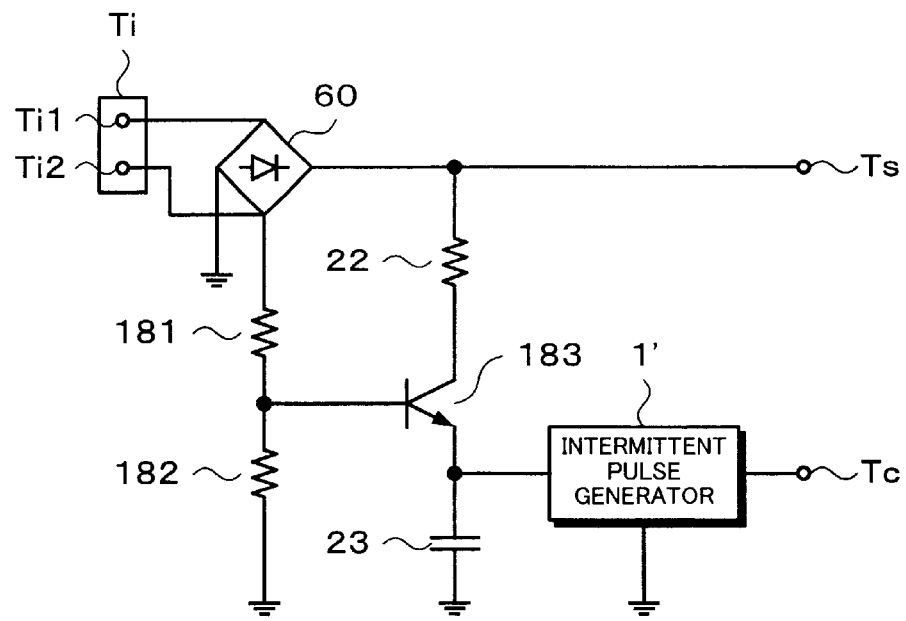
FIG. 22 is a block diagram showing another example for explaining the invention.

FIG. 22 shows another example in the case where the half-wave rectified current is selected. In this example, a transistor 183 is turned on/off in accordance with the half-wave rectified current which is supplied from a node of resistors 181 and 182. When the transistor 183 is turned on, the power source which is outputted from the diode bridge 60 is supplied to the intermittent pulse generator 1'.

When comparing FIGS. 21 and 22, a resistance of a time constant in another example shown in FIG. 22 can be suppressed to a value lower than that in FIG. 21. That is, a loss which is caused in another example shown in FIG. 22 can be suppressed to a value smaller than that in FIG. 21.

Figure 23:
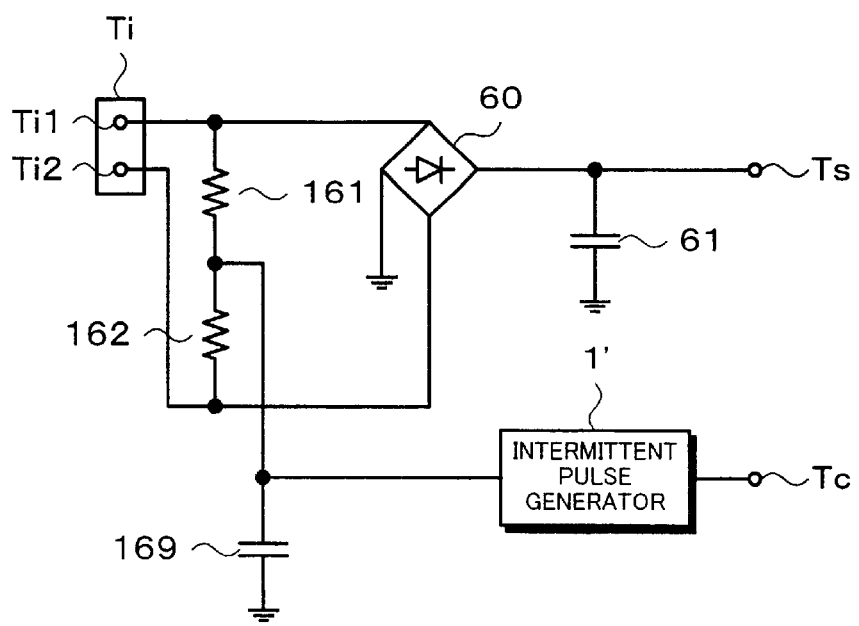
FIG. 23 is a block diagram showing an example for explaining the invention.

FIG. 23 shows an example in the case where the full-wave rectified current is selected. In this example, the full-wave rectified current is supplied to the intermittent pulse generator 1' through a time constant circuit comprising one of the resistors 161 and 162 and a capacitor 169.

Although the foregoing embodiment have been described as an example in which the invention is applied to a TV apparatus and a VTR apparatus, the invention can be also applied to any electronic equipment so long as it receives an AC power source and has a standby mode. For example, the invention can be also applied to a personal computer and can be also applied to a cellularphone in a charging mode, a camera-integrated type VTR, or the like.

According to the invention, by providing the switching circuit for the primary side of the transformer and turning off the switching circuit, the electric power consumption in the standby mode can be suppressed. When the switching circuit is controlled, since the inputted AC power source is used and the intermittent pulses are generated, the electric power consumption can be further suppressed.

The present invention is not limited to the foregoing embodiments but many modifications and variations are possible within the spirit and scope of the appended claims of the invention.

What is claimed is:

1. A power source apparatus, comprising:

pulse generating means to which an AC power source is supplied and which intermittently generates pulses by time constant means constructed by a resistor and a capacitor, and means for receiving the generated pulses from said pulse generating means and for providing a power source in a standby mode by turning on/off the power source in accordance with the received pulses.

2. An apparatus according to claim 1, wherein said pulse generating means comprises:

the time constant means constructed by the resistor and capacitor;

first voltage detecting means for detecting a voltage which is supplied;

switching means; and second voltage detecting means for detecting a voltage which is outputted from said switching means, and after a time constant set by said time constant means, when a voltage higher than a first reference voltage is detected in said first voltage detecting means, said switching means is turned on, and when a voltage lower than a second reference voltage is detected by said second voltage detecting means, said switching means is turned off, thereby intermittently generating the pulses.

3. An apparatus according to claim 1, further comprising current detecting means for detecting a load current, and wherein an energy saving mode in which an electric power consumption is suppressed and a supplying mode in which an electric power is supplied are switched in accordance with a detection output of said current detecting means.

4. An apparatus according to claim 1, wherein said pulse generating means further has constant voltage means in order to stabilize the AC power source which is supplied.

5. An apparatus according to claim 1, wherein said pulse generating means further has constant current means in order to stabilize the AC power source which is supplied.

6. An apparatus according to claim 1, wherein in said pulse generating means, an input impedance is changed in accordance with the AC power source which is supplied.

7. An apparatus according to claim 1, further comprising selecting means for selecting one of a full-wave rectified current, a half-wave rectified current, and a rectified output in order to set an input voltage value to said pulse generating means into an almost constant value irrespective of a difference of a voltage value of the AC power source.

8. A pulse generating apparatus to which an AC power source is supplied, comprising:

time constant means constructed by a resistor and a capacitor;

first voltage detecting means for detecting a voltage which is supplied;

switching means; and second voltage detecting means for detecting a voltage which is outputted from said switching means, wherein after a time constant set by said time constant means, when a voltage higher than a first reference voltage is detected in said first voltage detecting means, said switching means is turned on, and when a voltage lower than a second reference voltage is detected in said second voltage detecting means, said switching means is turned off, thereby intermittently generating pulses.

9. An apparatus according to claim 8, further comprising constant voltage means in order to stabilize the AC power source which is supplied.

10. An apparatus according to claim 8, further comprising constant current means in order to stabilize the AC power source which is supplied.

11. An apparatus according to claim 8, wherein an input impedance is changed in accordance with the AC power source which is supplied.

12. An apparatus according to claim 8, further comprising selecting means for selecting one of a full-wave rectified current, a half-wave rectified current, and a rectified output in order to set the input voltage value into an almost constant value irrespective of a difference of a voltage value of the AC power source.

* * * * *